(12) United States Patent
Zheltov et al.

(10) Patent No.: US 7,007,055 B2
(45) Date of Patent: Feb. 28, 2006

(54) METHOD OF PERFORMING NXM DISCRETE COSINE TRANSFORM

(75) Inventors: Sergey N. Zheltov, N. Novgorod (RU); Stanislav V. Bratanov, N. Novgorod (RU); Roman A. Belenov, N. Norgorod (RU); Alexander N. Knyazev, N. Norgorod (RU)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 10/096,987

(22) Filed: Mar. 12, 2002

(65) Prior Publication Data

US 2003/0177158 A1   Sep. 18, 2003

(51) Int. Cl.
*G06F 17/14* (2006.01)
(52) U.S. Cl. .................................. 708/402; 708/401
(58) Field of Classification Search ......... 708/401–402
See application file for complete search history.

(56) References Cited

U.S. PATENT DOCUMENTS

| | | | | |
|---|---|---|---|---|
| 5,428,567 A | * | 6/1995 | Horvath et al. | 708/401 |
| 5,479,364 A | * | 12/1995 | Jones et al. | 708/402 |
| 5,754,457 A | * | 5/1998 | Eitan et al. | 708/402 |
| 5,801,975 A | * | 9/1998 | Thayer et al. | 708/402 |
| 5,859,788 A | * | 1/1999 | Hou | 708/400 |

OTHER PUBLICATIONS

Mitchell, et al., "MPEG Video Compression Standard," 1995, pp. 33-49, International Thomson Publishing, NY.
Sherlock, et al., "Algorithm 749 Fast Discrete Cosine Transform," Paper, pp. 1-5.
Shi, et al., "Image and Video Compression for Multimedia Engineering," 2000, pp. 88-92, CRC Press.
John Watkinson, "MPEG-2," 1999, pp v-viii, 104-108, Focal Press.
"Table B.14—DCT coefficients Table zero," ISO/IEC 13818-2:1996(E), 1996, pp 1-2.
ISO/IEC 14496-2:1999(E), 1999, pp. 311.
"Using Streaming SIMD Extensions in a Fast DCT Algorithm for MPEG Encoding," Version 1.2, Jan. 1999, pp. iii-iv, 1-7, Intel Corporation, USA.
"A Fast Precise Implementation of 8×8 Discrete Cosine Transform Using the Streaming SIMD Extensions and MMX Instructions," Version 1.0, Apr. 1999, pp. iii-iv, 1-21, Intel Corporation, USA.
Trac D. Tran, "The BinDCT: Fast Multiplierless Approximation of the DCT," IEEE Signal Processing Letters, Jun. 2000, pp. 141-144, vol. 7, No. 6, IEEE, USA.
Jie Liang and Trac D. Tran, "Approximating the DCT with the Lifting Scheme: Systematic Design and Applications," IEEE, 2000, pp. 192-196, USA.

(Continued)

*Primary Examiner*—Tan V. Mai
(74) *Attorney, Agent, or Firm*—Steven P. Skabrat

(57) ABSTRACT

A fast and precise method to perform inverse and forward Discrete Cosine Transform (DCT) is disclosed. The method may be used for implementing a two-dimensional (2D) inverse or forward DCT that operates on an N×M coefficient block and has a higher accuracy than is specified by the IEEE 1180-1990 standard (for the inverse operation). The disclosed method includes the following stages: based on integer operations, a fixed point one dimensional (1D) DCT may be performed on each row of an input coefficient block, an integer-to-single-precision floating point result conversion may be performed, and a single precision floating point 1D DCT may be performed on each column of the coefficient block resulting from the previous stages.

16 Claims, 2 Drawing Sheets

OTHER PUBLICATIONS

Seehyun Kim et al., "Fixed-Point Optimization Utility for C and C++ Based Digital Signal Processing Programs," IEEE Transactions on Circuits and Systems II: Analog and Digital Signal Processing, Nov. 1998, pp. 1455-1464, vol. 45, No. 11, IEEE, USA.

Shahriar M. Akramullah et al., "Optimization of H.263 Video Encoding Using a Single Processor Computer: Performance Tradeoffs and Benchmarking," IEEE Transactions on Circuits and Systems for Video Technology, Aug. 2001, pp. 901-915, vol. 11, No. 8, IEEE, USA.

* cited by examiner

METHOD OF PERFORMING NXM DISCRETE COSINE TRANSFORM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to video processing and, more specifically, to a Discrete Cosine Transform (DCT) performed on an N×M coefficient block in a system implementing a block-based, Moving Pictures Expert Group (MPEG)-like video coding standard.

2. Description

Many video coding standards, such as those developed by MPEG, are based on sample-to-frequency domain transitions and employ two-dimensional (2D) forward and inverse Discrete Cosine Transform (DCT) for converting raster data to frequency coefficient blocks, and for converting the compressed coefficient blocks back to raster data, respectively. The 2D DCT operation is defined by MPEG standards (e.g., ISO/IEC 13818-2, MPEG-2 coding standard: Video, ISO/IEC 14496-2, MPEG-4 coding standard, Visual) as a transformation of an 8×8 coefficient block and appears to be one the most time-consuming parts of a compressed video processing pipeline.

Some video coding standards (e.g., MPEG-4) impose additional restrictions on DCT precision compared to one defined by, for example, the Institute of Electrical and Electronics Engineers (IEEE) 1180-1990 standard ("IEEE Standard Specifications for the Implementation of 8×8 Inverse Discrete Cosine Transform", 1997). Thus, the MPEG-4 standard treats the aforementioned standard requirements as necessary but not sufficient: "where arithmetic precision is not specified, such as in the calculation of the inverse DCT, the precision shall be sufficient so that significant errors do not occur in the final integer values." For some coded video sequences, satisfactory results can be achieved if the DCT operation is implemented using single precision floating point arithmetic. At the same time, floating point operations are somewhat slower than integer instructions involved in fixed point calculations widely used in video processing systems to compute an 8×8 DCT.

Therefore, a need exists for the capability to provide high speed DCT execution while preserving the accuracy of single precision floating point operations.

BRIEF DESCRIPTION OF THE DRAWINGS

The features and advantages of the present invention will become apparent from the following detailed description of the present invention in which.

DETAILED DESCRIPTION

Figure 1:
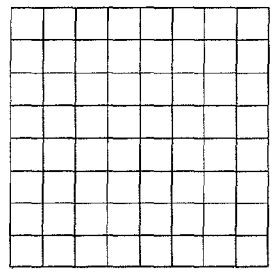
FIG. 1 is a diagram illustrating an 8×8 coefficient block, decomposition of the block into rows, row-based application of a DCT and conversion operations, and an intermediate floating point coefficient block according to an embodiment of the present invention.
Figure 1:
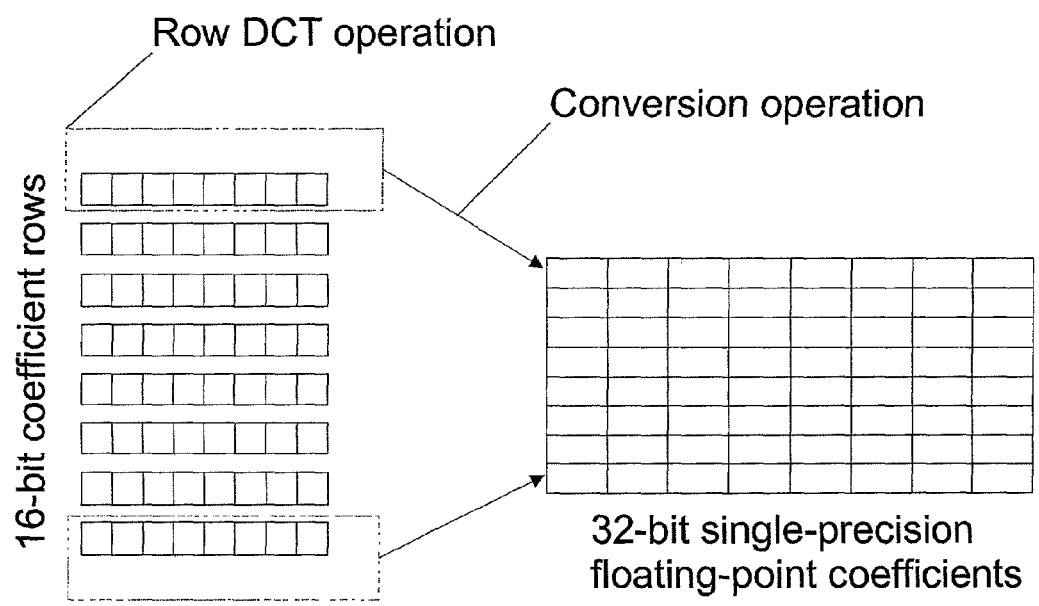

An embodiment of the present invention is a method of implementing two-dimensional N×M Inverse and Forward Discrete Cosine Transform (hereinafter DCT denotes both the inverse and forward operations). The method for the inverse operation has a higher accuracy than is defined by the IEEE 1180-1990 standard, and is designed to meet additional accuracy restrictions imposed by other standards, such as MPEG-4, for example. The forward DCT accuracy of embodiments of the present invention may be higher than can be achieved using integer fixed point methods, and unlike the prior art, scales with the absolute values of input coefficients.

Embodiments of the present invention comprise several stages: a fixed point 1D DCT may be performed on each row of an input coefficient block (this stage employs integer operations), integer-to-single-precision floating point conversion of the transformed row coefficients, and single precision floating point 1D DCT may be performed on each column of the coefficient block resulting from the previous stages.

One embodiment of the present invention uses 32-bit integer variables to store intermediate results and preserve computational accuracy for 8-bit and 12-bit integer coefficients. The embodiment employs integer operations, thus gaining additional performance compared to fully floating point methods. By using a 2D DCT decomposed into row and column 1D DCT processing stages, embodiments facilitate Single Instruction Multiple Data (SIMD)-based implementations.

Therefore, an embodiment of the present invention is a method of implementing 2D Inverse and Forward Discrete Cosine Transform (DCT) performed on an N×M coefficient block, where N and M are natural numbers. In one embodiment, N and M may be 8, although the invention is not limited in this respect. The method is intended to achieve higher performance than can be achieved with floating point computations, and to obtain more accurate results than integer fixed point methods are capable of. Since most modern video coding standards operate on quantized integer data, the input and output data of the disclosed DCT method are also integer.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

To meet the aforementioned processing goals, the 2D N×M DCT operation: (a) may be divided into N row N-point DCT and M column M-point DCT operations that can be efficiently implemented using SIMD operations; (b) employs integer fixed point computations for higher performance; (c) converts intermediate results to a single precision floating point form; and (d) uses floating point calculations to obtain final DCT values.

The forward 2D DCT may be defined as follows:

$$f_{nm} = c_n c_m \sum_{i=0}^{N-1} \sum_{j=0}^{M-1} \cos\frac{\pi n(2i+1)}{2N} \cos\frac{\pi m(2j+1)}{2M} x_{ij},$$

the inverse 2D DCT formula is:

$$x_{ij} = \sum_{n=0}^{N-1} \sum_{m=0}^{M-1} \cos\frac{\pi n(2i+1)}{2N} \cos\frac{\pi m(2j+1)}{2M} c_n c_m f_{nm},$$

where $$c_0 = \frac{1}{\sqrt{K}}, c_n = \sqrt{\frac{2}{K}}$$

for n=1, 2, ... K−1;

K denoted DCT length;

$f_{nm}$ denotes frequency domain coefficients; and $x_{ij}$ denotes spatial domain coefficients.

A N×M 2D DCT operation is equivalent to N-point DCT applied to rows and M-point DCT applied to columns of an input matrix.

The forward N-point DCT is defined as follows:

$$y_n = c_n \sum_{k=0}^{N-1} \cos\frac{\pi n(2k+1)}{2N} x_k,$$

and the inverse operation is:

$$x_k = \sum_{n=0}^{N-1} \cos\frac{\pi n(2k+1)}{2N} c_n y_n,$$

where $$c_0 = \frac{1}{\sqrt{N}}, c_n = \sqrt{\frac{2}{N}}$$

for n=1, 2, ... N−1;

$y_n$ denotes frequency domain coefficients; and $x_k$ denotes spatial domain coefficients.

The matrix form of the forward DCT is: y=C×x

The inverse DCT formula can be written as: y=$C^T$×x

FIG. 1 is a diagram illustrating an 8×8 coefficient block, decomposition of the block into rows, row-based application of DCT and conversion operations, and an intermediate floating-point coefficient block. One embodiment of the present invention operates on an 8×8 integer coefficient block, although other choices for N and M may also be used.

First, a fixed point integer DCT may be applied to rows. The row DCT is a series of eight coefficients, and for an efficient SIMD DCT implementation, an instruction that supports inter-element dependencies is needed (e.g., the pmaddwd MMX™/SSE™ instructions available in microprocessors from Intel Corporation). The row DCT method does not necessarily need to have the minimal number of multiplications. So, one possible DCT matrix factorization is defined below:

C=P×M×A, where C is a forward DCT operator, and P, M, and A are the following matrices:

$$A = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 1 & 0 & 0 & 0 & 0 & 0 & 0 & -1 \\ 0 & 1 & 0 & 0 & 0 & 0 & -1 & 0 \\ 0 & 0 & 1 & 0 & 0 & -1 & 0 & 0 \\ 0 & 0 & 0 & 1 & -1 & 0 & 0 & 0 \end{pmatrix}$$

$$M = \begin{pmatrix} c(4) & c(4) & c(4) & c(4) & 0 & 0 & 0 & 0 \\ c(2) & c(6) & -c(6) & -c(2) & 0 & 0 & 0 & 0 \\ c(4) & -c(4) & -c(4) & c(4) & 0 & 0 & 0 & 0 \\ c(6) & -c(2) & c(2) & -c(6) & 0 & 0 & 0 & 0 \\ 0 & 0 & 0 & 0 & c(1) & c(3) & c(5) & c(7) \\ 0 & 0 & 0 & 0 & c(3) & -c(7) & -c(1) & -c(5) \\ 0 & 0 & 0 & 0 & c(5) & -c(1) & c(7) & c(3) \\ 0 & 0 & 0 & 0 & c(7) & -c(5) & c(3) & -c(1) \end{pmatrix}$$

$$P = \begin{pmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{pmatrix}$$

Where $c(n) = \cos\frac{\pi n}{16}$.

The inverse DCT may be determined by transposing the forward DCT matrix (C).

The results of integer fixed point row DCT may then be converted to single precision floating point values. The conversion operation uses SIMD instructions to convert several elements simultaneously. The row DCT and conversion applied to all rows results in a single precision floating point coefficient block. This block may be viewed as input data for the next, column DCT stage.

Figure 2:
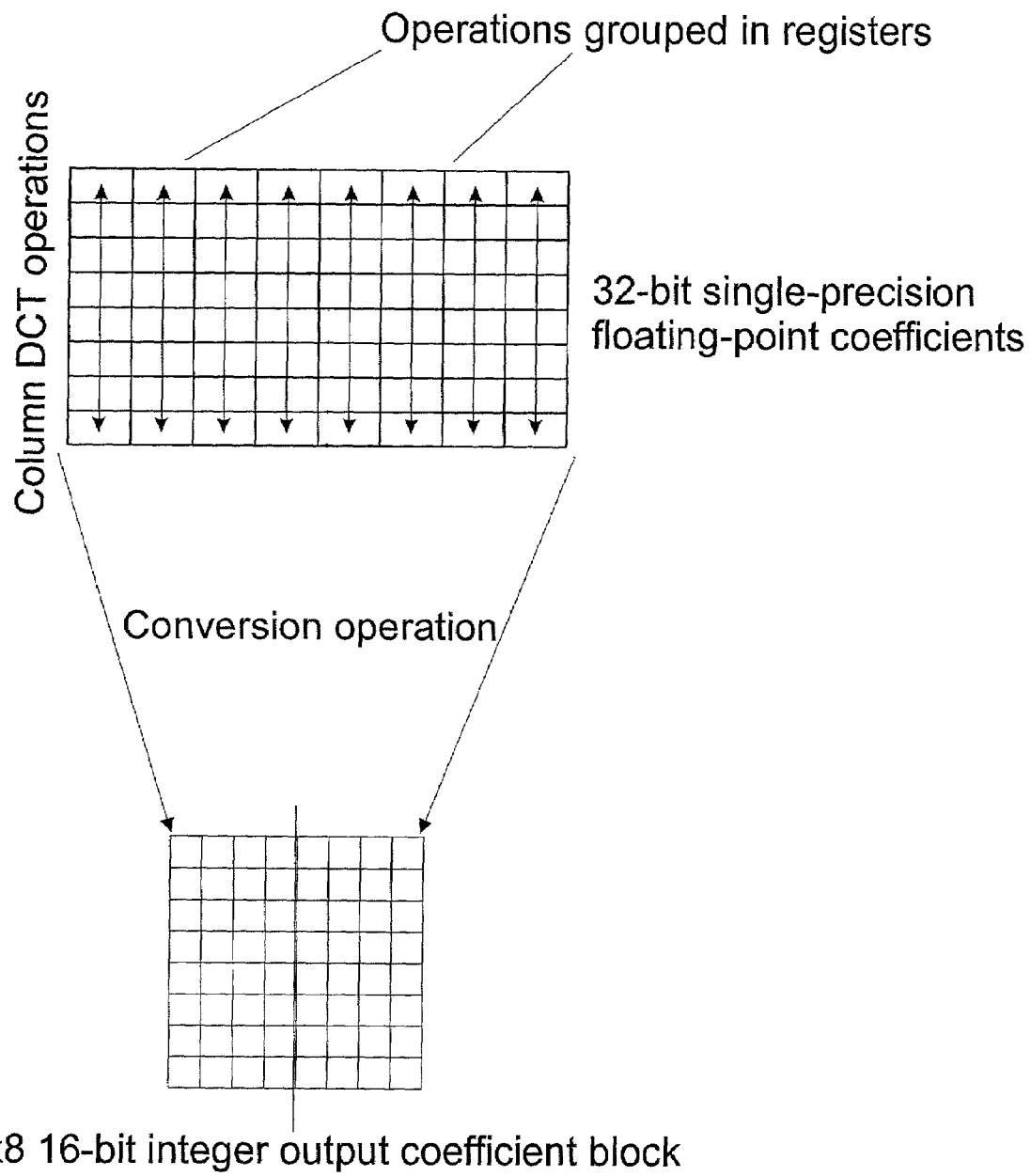
FIG. 2 is a diagram illustrating column-based application of a DCT to floating point coefficients, floating point to integer conversion, and a resulting integer coefficient block according to an embodiment of the present invention.

FIG. 2 is a diagram illustrating column-based application of DCT to floating point coefficients, floating point to integer conversion, and a resulting integer coefficient block. At this stage, the DCT operation may be applied to columns of the aforementioned floating point coefficient block. In order to utilize SIMD resources, the elements of several adjacent columns may be stored in one SIMD-register and processed simultaneously, that means the column DCT is based on a data parallelization method, and hence the number of operations to compute the column DCT may be minimized. Algorithms based on Discrete Fourier Transform (DFT) may best be used to perform this stage.

As proposed in "A Fast DCT-SQ Scheme for Images", by Y. Arai, T. Agui, and M. Nakajima, Trans. of IEICE, vol. E-71, no. 11, pp. 1095–1097, Nov. 1988, an inverse 8-point DCT operation may be defined as follows:

$$\cos\frac{\pi n}{16} c_n S_8(n) = \text{Re}\{F_{16}(n)\},$$

where $$c_0 = \frac{\sqrt{2}}{2}, c_n = \frac{1}{2}$$

for n=1, 2, ... 7;

$S_8(n)$ denotes transformed 8-point DCT coefficients; and $F_{16}(n)$ denotes 16-point Discrete Fourier Transform.

Multiplying each column element by $$\cos\frac{\pi n}{16} c_n$$

is equivalent to multiplying all elements of each row by $$\cos\frac{\pi k}{16} c_k,$$

where k denotes a row index, and may be pre-calculated during row DCT matrix initialization, and so does not cause computational overhead.

The inverse DFT matrix may be factored:

$L = B1 \times M \times A1 \times A2 \times A3,$ with:

$$B1 = \begin{pmatrix} 1 & 0 & 0 & 0 & 0 & 0 & 0 & 0 \\ 0 & 0 & 0 & 0 & 0 & 1 & 1 & 1 \\ 0 & 0 & 1 & 1 & 0 & 0 & 0 & 0 \\ 0 & 0 & 0 & 0 & -1 & -1 & 0 & 1 \\ 0 & 1 & 0 & 0 & 0 & 0 & 0 & 0 \\ 0 & 0 & 0 & 0 & 1 & -1 & 0 & 1 \\ 0 & 0 & -1 & 1 & 0 & 0 & 0 & 0 \\ 0 & 0 & 0 & 0 & 0 & 1 & -1 & 1 \end{pmatrix}$$

-continued $$M = \begin{pmatrix} 1 & 0 & 0 & 0 & 0 & 0 & 0 & 0 \\ 0 & 1 & 0 & 0 & 0 & 0 & 0 & 0 \\ 0 & 0 & C4 & 0 & 0 & 0 & 0 & 0 \\ 0 & 0 & 0 & 1 & 0 & 0 & 0 & 0 \\ 0 & 0 & 0 & 0 & -C2 & 0 & -C6 & 0 \\ 0 & 0 & 0 & 0 & 0 & C4 & 0 & 0 \\ 0 & 0 & 0 & 0 & -C6 & 0 & C2 & 0 \\ 0 & 0 & 0 & 0 & 0 & 0 & 0 & 1 \end{pmatrix}$$

$$A1 = \begin{pmatrix} 0 & 1 & 0 & 1 & 0 & 0 & 0 & 0 \\ 0 & -1 & 0 & 1 & 0 & 0 & 0 & 0 \\ 0 & 0 & 1 & 0 & 0 & 0 & 0 & 0 \\ 0 & 0 & -1 & 0 & 0 & 0 & 1 & 0 \\ 0 & 0 & 0 & 0 & 0 & 1 & 0 & 0 \\ -1 & 0 & 0 & 0 & 0 & 0 & 0 & 0 \\ 1 & 0 & 0 & 0 & 1 & 0 & 0 & 0 \\ -1 & 0 & 0 & 0 & -1 & 0 & 0 & 1 \end{pmatrix}$$

$$A2 = \begin{pmatrix} 0 & 1 & 0 & 0 & 0 & 0 & 0 & -1 \\ 0 & 0 & 0 & 1 & 0 & 1 & 0 & 0 \\ 0 & 0 & 0 & 1 & 0 & -1 & 0 & 0 \\ 0 & 0 & 0 & 0 & 1 & 0 & 1 & 0 \\ 0 & 0 & 1 & 0 & 0 & 0 & 0 & 0 \\ 0 & 0 & 0 & 0 & 0 & 0 & 0 & 1 \\ 0 & 0 & 0 & 0 & 1 & 0 & -1 & 0 \\ 1 & 0 & 0 & 0 & 0 & 0 & 0 & 0 \end{pmatrix}$$

$$A3 = \begin{pmatrix} 1 & 0 & 0 & 0 & 0 & 0 & 0 & -1 \\ 0 & 0 & -1 & 0 & 0 & 1 & 0 & 0 \\ 0 & 1 & 0 & 0 & 0 & 0 & -1 & 0 \\ 0 & 1 & 0 & 0 & 0 & 0 & 1 & 0 \\ 1 & 0 & 0 & 0 & 0 & 0 & 0 & 1 \\ 0 & 0 & 1 & 0 & 0 & 1 & 0 & 0 \\ 0 & 0 & 0 & 1 & 1 & 0 & 0 & 0 \\ 0 & 0 & 0 & -1 & 1 & 0 & 0 & 0 \end{pmatrix}$$

Where $$C2 = 2\cos\frac{\pi}{8};$$

$C4 = \sqrt{2};$ $$C6 = 2\sin\frac{\pi}{8}.$$

After the inverse DCT operation is performed according to the above factorization, the resulting coefficients may be converted to integer values.

One non-limiting example embodiment of the present invention is listed in Appendix A. IEEE 1180-1990 compliance test results are listed in Appendix B. Measurements of DCT performance as optimized for a Pentium®4 processor commercially available from Intel Corporation are shown in Appendix C. One skilled in the art will recognize that the accuracy of the present invention scales with input coefficients, unlike the accuracy of any existing integer fixed point implementations.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, handheld computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

APPENDIX A

```
For inverse 8x8 DCT see:      idct8x8ssfs.asm
For forward 8x8 DCT see:      fdct8x8ssfs.asm
The files require Microsoft ® Macro Assembler Compiler version 6.15 or
higher.
The DCT function prototypes for C + + language are:
extern "C" void idct8x8ssfs(short*);
extern "C" void fdct8x8ssfs(short*);
========================================================
File: fdct8x8ssfs.asm
========================================================
© 2002 Intel Corporation
.686
.xmm
xmmword textequ <qword>
.model      FLAT
tws                 equ        esp + 4
ssetmp_store        equ        [tws + 0100h]
;;; ;;; ;;; short-short-float-short
fdct_row2           macro      i, scales
        ;;; IN eax -> short 8x8 block
        ;;; IN i == row index
        ;;; IN scales -> coeffs
        ;;; OUT [esp +4 . . .] = float 8x8 block
        ;;; ;;; IN        eax -> row
        ;;; ;;; OUT       xmm5:|'3|'2|'1|'0
        ;;; ;;; OUT       xmm0:|'7|'6|'5|'4
        ;;; ;;; OUT       xmm1:|"3|"2|"1|"0
        ;;; ;;; OUT       xmm3:|"7|"6|"5|"4
        movaps xmm0,xmmword ptr [eax + i * 10h]          ;;; xmm0: |'7|'6|'5|'4|'3|'2|'1|'0
        movaps xmm1,xmmword ptr [eax + i * 10h + 10h]    ;;; xmm1: |"7|"6|"5|"4|"3|"2|"1|"0
        pshufhw xmm0,xmm0,00011011b                      ;;; xmm0: |4|5|6|7|3|2|1|0
        pshufhw xmm1,xmm1,00011011b                      ;;; xmm1:
```

APPENDIX A-continued

```
|4|5|6|7|3|2|1|0
        movaps    xmm2,xmm1
        movhlps xmm2,xmm0                              ;;; xmm2:
|"4|"5|"6|"7|'4|'5|'6|'7
        movlhps xmm0,xmm1                              ;;; xmm0:
|"3|"2|"1|"0|'3|'2|'1|'0
        movaps xmm1,xmm0
        paddsw xmm0,xmm2                               ;;; xmm0:
|"3+4|"2+5|"1+6|"0+7|'3+4|'2+5|'1+6|'0+7
        psubsw xmm1,xmm2                               ;;; xmm1: |"3-4|"2-5|"1-6|"0-7|'3-
4|'2-5|'1-6|'0-7
        movaps xmm3,xmm0
        punpckldq      xmm0,xmm1                       ;;; xmm0: |'3-4|'2-5|'3+4|'2+5|'1-
6|'0-7|'1+6|'0+7
        punpckhdq      xmm3,xmm1                       ;;; xmm3: |"3-4|"2-5|"3+4|"2+5|"1-
6|"0-7|"1+6|"0+7
        pshufd xmm2,xmm0,01001110b                     ;;; xmm2: |'1-6|'0-7|'1+6|'0+7|'3-
4|'2-5|'3+4|'2+5
        pshufd xmm4,xmm3,01001110b                     ;;; xmm4: |"1-6|"0-7|"1+6|"0+7|"3-
4|"2-5|"3+4|"2+5
        movaps    xmm5,xmmword ptr scales
        movaps    xmm6,xmmword ptr scales + 10h
        pmaddwd   xmm5,xmm0
        pmaddwd   xmm6,xmm2
        pmaddwd   xmm0,xmmword ptr scales + 20h
        pmaddwd   xmm2,xmmword ptr scales + 30h
        paddd     xmm5,xmm6
        paddd     xmm0,xmm2
        movaps    xmm1,xmmword ptr scales
        movaps    xmm7,xmmword ptr scales + 10h
        pmaddwd   xmm1,xmm3
        pmaddwd   xmm7,xmm4
        pmaddwd   xmm3,xmmword ptr scales + 20h
        pmaddwd   xmm4,xmmword ptr scales + 30h
        paddd     xmm1,xmm7
        paddd     xmm3,xmm4
        cvtdq2ps        xmm5,xmm5
        cvtdq2ps        xmm0,xmm0
        movaps          xmm2,xmmword ptr scale_const
        cvtdq2ps        xmm1,xmm1
        cvtdq2ps        xmm3,xmm3
        mulps           xmm5,xmm2
        mulps           xmm0,xmm2
        mulps           xmm1,xmm2
        mulps           xmm3,xmm2
        movaps          xmmword ptr [tws + i * 20h],xmm5
        movaps          xmmword ptr [tws + i * 20h + 10h],xmm0
        movaps          xmmword ptr [tws + (i + 1) * 20h],xmm1
        movaps          xmmword ptr [tws + (i + 1) * 20h + 10h],xmm3
        endm
fdct_row        macro   i, scales
        ;;; IN eax -> short 8x8 block
        ;;; IN i == row index
        ;;; IN scales -> coeffs
        ;;; OUT [esp + 4 . . .] = float 8x8 block
        ;;; ;;; IN            eax -> row
        ;;; ;;; OUT           xmm5:|3|2|1|0
        ;;; ;;; OUT           xmm3:|7|6|5|4
        movaps xmm0,xmmword ptr [eax + i * 10h]        ;;; xmm0:
|7|6|5|4|3|2|1|0
        pshufhw xmm0,xmm0,00011011b                    ;;; xmm0:
|4|5|6|7|3|2|1|0
        movhlps xmm1,xmm0                              ;;; xmm1:
|x|x|x|x|4|5|6|7
        movaps xmm2,xmm0
        psubsw xmm2,xmm1                               ;;; xmm2: |x|x|x|x|3-
4|2-5|1-6|0-7
        paddsw xmm0,xmm1                               ;;; xmm0:
|x|x|x|x|3+4|2+5|1+6|0+7
        punpckldq      xmm0,xmm2                       ;;; xmm0: |3-4|2-5|3+4|2+5|1-
6|0-7|1+6|0+7
        pshufd xmm3,xmm0,01000100b                     ;;; xmm3: |1-6|0-7|1+6|0+7|1-
6|0-7|1+6|0+7
        pshufd xmm4,xmm0,11101110b                     ;;; xmm4: |3-4|2-5|3+4|2+5|3-
```

APPENDIX A-continued

```
4|2–5|3+4|2+5
        movaps      xmm5,xmmword ptr scales
        movaps      xmm6,xmmword ptr scales + 10h
        pmaddwd     xmm5, xmm3
        pmaddwd     xmm6,xmm4
        pmaddwd     xmm3,xmmword ptr scales + 20h
        pmaddwd     xmm4,xmmword ptr scales + 30h
        paddd       xmm5,xmm6
        paddd       xmm3,xmm4
        cvtdq2ps        xmm5,xmm5
        cvtdq2ps        xmm3,xmm3
        movaps      xmm2,xmmword ptr scale_const
        mulps       xmm5,xmm2
        mulps       xmm3,xmm2
        movaps      xmmword ptr [tws + i * 20h],xmm5
        movaps      xmmword ptr [tws + i * 20h + 10h],xmm3
        endm
cvt_store       macro i, r, offs
        ;;; OUT [eax . . .] = coeff. row
        cvtps2dq        r,r
        packssdw        r,r
if offs EQ 0    ;;; low
        movlps          xmmword ptr [eax + i * 10h],r
else
        movhps          xmmword ptr [eax + i * 10h + 08h],r
endif
        endm
fdct_column     macro offs
        ;;; IN    tws –> float 8x8 block (esp + 4)
        ;;; IN    eax –> dst (short 8x8 block)
        ;;; IN    fdct_float_1Dscale
        ;;; OUT   [eax . . .] = short 8x8 block
        movaps      xmm3,xmmword ptr [tws + 30h * 2 + offs]
        movaps      xmm6,xmmword ptr [tws + 40h * 2 + offs]
        movaps      xmm4,xmm3
        addps       xmm3,xmm6
        subps       xmm4,xmm6
        movaps      xmm2,xmmword ptr [tws + 20h * 2 + offs]
        movaps      xmm6,xmmword ptr [tws + 50h * 2 + offs]
        movaps      xmm5,xmm2
        addps       xmm2,xmm6
        subps       xmm5,xmm6
        movaps      xmmword ptr ssetmp_store,xmm3
        movaps      xmm1,xmmword ptr [tws + 10h * 2 + offs]
        movaps      xmm3,xmmword ptr [tws + 60h * 2 + offs]
        movaps      xmm6,xmm1
        addps       xmm1,xmm3
        subps       xmm6,xmm3
        movaps      xmm0,xmmword ptr [tws + 00h * 2 + offs]
        movaps      xmm3,xmmword ptr [tws + 70h * 2 + offs]
        movaps      xmm7,xmm0
        addps       xmm0,xmm3
        subps       xmm7,xmm3
        addps       xmm4,xmm5
        addps       xmm5,xmm6
        addps       xmm6,xmm7
        movaps      xmm3,xmm4
        subps       xmm3,xmm6
        mulps       xmm3,xmmword ptr Cp0_382
        mulps       xmm4,xmmword ptr Cp0_541
        addps       xmm4,xmm3
        mulps       xmm6,xmmword ptr Cp1_306
        addps       xmm6,xmm3
        mulps       xmm5,xmmword ptr Cp0_707
        movaps      xmm3,xmm7
        addps       xmm7,xmm5
        subps       xmm3,xmm5
        movaps      xmm5,xmm3
        addps       xmm3,xmm4
        subps       xmm5,xmm4
        movaps      xmm4,xmm7
        addps       xmm7,xmm6
        subps       xmm4,xmm6
        movaps      xmm6,xmm0
        addps       xmm0,xmmword ptr ssetmp_store
        subps       xmm6,xmmword ptr ssetmp_store
        movaps      xmmword ptr ssetmp_store,xmm4
```

APPENDIX A-continued

```
        movaps      xmm4,xmm1
        addps       xmm1,xmm2
        subps       xmm4,xmm2
        movaps      xmm2,xmm0
        addps       xmm0,xmm1
        subps       xmm2,xmm1
        addps       xmm4,xmm6
        mulps       xmm4,xmmword ptr Cp0_707
        movaps      xmm1,xmm6
        addps       xmm6,xmm4
        subps       xmm1,xmm4
;;; 0, 7, 6, 5,     2, 3, 1, ssetmp,     [tmp == xmm4]
        mulps       xmm0,xmmword ptr fdct_float_1Dscale + 00h
        mulps       xmm7,xmmword ptr fdct_float_1Dscale + 10h
        cvt_store   0, xmm0, offs
        cvt_store   1, xmm7, offs
        mulps       xmm6,xmmword ptr fdct_float_1Dscale + 20h
        mulps       xmm5,xmmword ptr fdct_float_1Dscale + 30h
        cvt_store   2, xmm6, offs
        cvt_store   3, xmm5, offs
        movaps      xmm4,xmmword ptr ssetmp_store
        mulps       xmm2,xmmword ptr fdct_float_1Dscale + 40h
        mulps       xmm3,xmmword ptr fdct_float_1Dscale + 50h
        cvt_store   4, xmm2, offs
        cvt_store   5, xmm3, offs
        mulps       xmm1,xmmword ptr fdct_float_1Dscale + 60h
        mulps       xmm4,xmmword ptr fdct_float_1Dscale + 70h
        cvt_store   6, xmm1, offs
        cvt_store   7, xmm4, offs
        endm
_TEXT segment
;;; 8x8 fDCT; integer row stage, AAN float column stage, short-to-float/float-
to-short conversion
_fdct8x8ssfs    proc    near
        ;;; IN/OUT [esp + 4] -> short 8x8 block
        mov         eax,esp
        sub         esp,0110h          ;;; space for float 8x8 block
        and         esp,0fffffff0h
        push        eax
        mov         eax, [eax + 4]
        ;;; eax -> short IN/OUT 8x8 block
        ;;; esp + 4 -> float intermediate 8x8 block
        fdct_row2   0, coeffs0wd
        fdct_row2   2, coeffs0wd
        fdct_row2   4, coeffs0wd
        fdct_row2   6, coeffs0wd
if 0
        fdct_row    0, coeffs0w
        fdct_row    1, coeffs0w
        fdct_row    2, coeffs0w
        fdct_row    3, coeffs0w
        fdct_row    4, coeffs0w
        fdct_row    5, coeffs0w
        fdct_row    6, coeffs0w
        fdct_row    7, coeffs0w
endif
        fdct_column 00h
        fdct_column 10h
exit:
        mov         esp, [esp]
        ret
_fdct8x8ssfs    endp
_TEXT   ends
_DATA   segment
;;; coeffs
Cp0_382 dd      4 dup(0.382683433)
Cp0_541 dd      4 dup(0.541196100)
Cp1_306 dd      4 dup(1.306562965)
Cp0_707 dd      4 dup(0.707106781)
factor equ      2.8284271247461903
fdct_float_1Dscale      dd      4 dup(0.3535533905932737875);;;(0.1250000000000)
* factor
                        dd      4 dup(0.2548977895521687286);;;(0.0901199777509)
-//-
                        dd      4 dup(0.2705980500731764547);;;(0.0956708580913)
                        dd      4 dup(0.3006724434675027041);;;(0.1063037618459)
                        dd      4 dup(0.3535533905932737875);;;(0.1250000000000)
```

APPENDIX A-continued

```
                    dd      4 dup(0.4499881115681958855);;;(0.1590948225716)
                    dd      4 dup(0.6532814824381269648);;;(0.2309698831278)
                    dd      4 dup(1.2814577238706289522);;;(0.4530637231764)
       ;;; 1 / 2^16
scale_const         dd      4 dup(37800000h)
       ;;; 16-bit
coeffs0w            dw      5A82h,   5A82h,   7D8Ah,   6A6Eh,   7642h,   30FCh,   6A6Eh,
0E708h
                    dw      5A82h,   5A82h,   471Dh,   18F9h,   0CF05h,  089BFh,  08277h,
0B8E4h
                    dw      5A82h,   0A57Fh,  471Dh,   08277h,  30FCh,   089BFh,  18F9h,
0B8E4h
                    dw      0A57Fh,  5A82h,   18F9h,   6A6Eh,   7642h,   0CF05h,  6A6Eh,
08277h
coeffs0wd           dw      5A82h,   5A82h,   7D8Ah,   6A6Eh,   0CF05h,  089BFh,  08277h,
0B8E4h
                    dw      5A82h,   5A82h,   471Dh,   18F9h,   7642h,   30FCh,   6A6Eh,
0E708h
                    dw      5A82h,   0A57Fh,  471Dh,   08277h,  7642h,   0CF05h,  6A6Eh,
08277h
                    dw      0A57Fh,  5A82h,   18F9h,   6A6Eh,   30FCh,   089BFh,  18F9h,
0B8E4h
_DATA      ends
           end
==========================================================
File: idct8x8ssfs.asm
==========================================================
© 2002 Intel Corporation
.686
.xmm
xmmword textequ <qword>
.model FLAT
_TEXT segment
tws                 equ     esp + 4
ssetmp_store        equ     [tws + 0100h]
;;; ;;; ;;; short-float
idct_row2           macro   i, scales
       ;;; IN         eax -> short 8x8 block
       ;;; IN         i == row index
       ;;; IN         scales -> modified coeffs
       ;;; OUT        [esp + 4. . .] = float 8x8 block
       ;;; ;;; IN     eax -> row
       ;;; ;;; OUT    xmm0:|3|2|1|0
       ;;; ;;; OUT    xmm1:|7|6|5|4
                    movdqa  xmm0,xmmword ptr [eax + i * 10h]          ;;; |7|6|5|4|3|2|1|0
                    movaps  xmm4,xmmword ptr [eax + i * 10h + 10h]
                    pshuflw xmm0,xmm0,11011000b                       ;;; |7|6|5|4|3|1|2|0
                    pshuflw xmm4,xmm4,11011000b
                    pshufhw xmm0,xmm0,11011000b                       ;;; |7|5|6|4|3|1|2|0
                    pshufhw xmm4,xmm4,11011000b
                    pshufd  xmm1,xmm0,10101010b                       ;;; xmm1: |6|4|6|4|6|4|6|4
                    pshufd  xmm5,xmm4,10101010b
                    pshufd  xmm2,xmm0,01010101b                       ;;; xmm2: |3|1|3|1|3|1|3|1
                    pshufd  xmm6,xmm4, 01010101b
                    pshufd  xmm3,xmm0,0ffh                            ;;; xmm3: |7|5|7|5|7|5|7|5
                    pshufd  xmm7, xmm4, 0ffh
                    pshufd  xmm0,xmm0,00h                             ;;; xmm0: |2|0|2|0|2|0|2|0
                    pshufd  xmm4,xmm4, 00h
                    pmaddwd xmm0,xmmword ptr [scales]                 ;;; xmm0: |2x0|2x0|2x0|2x0
                    pmaddwd xmm4,xmmword ptr [scales + 40h]
                    pmaddwd xmm1,xmmword ptr [scales + 10h]           ;;; xmm1: |6x4|6x4|6x4|6x4
                    paddd   xmm0,xmm1                                 ;;; xmm0: |e|e|e|e
                    pmaddwd xmm2,xmmword ptr [scales + 20h]           ;;; xmm2: |3x1|3x1|3x1|3x1
                    pmaddwd xmm3,xmmword ptr [scales + 30h]           ;;; xmm3: |7x5|7x5|7x5|7x5
                    movdqa  xmm1,xmm0
                    pmaddwd xmm5,xmmword ptr [scales + 50h]
                    paddd   xmm4,xmm5
                    pmaddwd xmm6,xmmword ptr [scales + 60h]
                    paddd   xmm2,xmm3                                 ;;; xmm2: |o|o|o|o
```

APPENDIX A-continued

```
            movaps      xmm5,xmm4
            pmaddwd     xmm7,xmmword ptr [scales + 70h]
            paddd       xmm6,xmm7
            paddd       xmm0,xmm2                           ;;; xmm0: |3|2|1|0
            paddd       xmm4,xmm6
            psubd       xmm1,xmm2                           ;;; xmm1: |4|5|6|7
            psubd       xmm5,xmm6
            pshufd      xmm1,xmm1,00011011b                 ;;; xmm1: |7|6|5|4
            pshufd      xmm5,xmm5,00011011b
            movaps      xmm2,xmmword ptr scale_const
            cvtdq2ps    xmm0,xmm0
            cvtdq2ps    xmm1,xmm1
            mulps       xmm0,xmm2
            cvtdq2ps    xmm4,xmm4
            cvtdq2ps    xmm5,xmm5
            mulps       xmm1,xmm2
            mulps       xmm4,xmm2
            mulps       xmm5,xmm2
            movaps      xmmword ptr [tws + i * 20h],xmm0
            movaps      xmmword ptr [tws + i * 20h + 10h],xmm1
            movaps      xmmword ptr [tws + (i + 1) * 20h],xmm4
            movaps      xmmword ptr [tws + (i + 1) * 20h + 10h],xmm5
            endm
idct_row    macro       i, scales
            ;;; IN      eax -> short 8x8 block
            ;;; IN      i == row index
            ;;; IN      scales -> modified coeffs
            ;;; OUT     [esp + 4 . . .] = float 8x8 block
            ;;; ;;; IN      eax -> row
            ;;; ;;; OUT     xmm0:|3|2|1|0
            ;;; ;;; OUT     xmm1:|7|6|5|4
            movdqa      xmm0,xmmword ptr [eax + i * 10h]    ;;; |7|6|5|4|3|2|1|0
            pshuflw     xmm0,xmm0,11011000b                 ;;; |7|6|5|4|3|1|2|0
            pshufhw     xmm0,xmm0,11011000b                 ;;; |7|5|6|4|3|1|2|0
            pshufd      xmm1,xmm0,10101010b                 ;;; xmm1: |6|4|6|4|6|4|6|4
            pshufd      xmm2,xmm0,01010101b                 ;;; xmm2: |3|1|3|1|3|1|3|1
            pshufd      xmm3,xmm0,0ffh                      ;;; xmm3: |7|5|7|5|7|5|7|5
            pshufd      xmm0,xmm0,00h                       ;;; xmm0: |2|0|2|0|2|0|2|0
            pmaddwd     xmm0,xmmword ptr [scales]           ;;; xmm0: |2x0|2x0|2x0|2x0
            pmaddwd     xmm1,xmmword ptr [scales + 10h]     ;;; xmm1: |6x4|6x4|6x4|6x4
            paddd       xmm0,xmm1                           ;;; xmm0: |e|e|e|e
            pmaddwd     xmm2,xmmword ptr [scales + 20h]     ;;; xmm2: |3x1|3x1|3x1|3x1
            pmaddwd     xmm3,xmmword ptr [scales + 30h]     ;;; xmm3: |7x5|7x5|7x5|7x5
            paddd       xmm2,xmm3                           ;;; xmm2: |o|o|o|o
            movdqa      xmm1,xmm0
            paddd       xmm0,xmm2                           ;;; xmm0: |3|2|1|0
            psubd       xmm1,xmm2                           ;;; xmm1: |4|5|6|7
            pshufd      xmm1,xmm1,00011011b                 ;;; xmm1: |7|6|5|4
            cvtdq2ps    xmm0,xmm0
            cvtdq2ps    xmm1,xmm1
            movaps      xmm2,xmmword ptr scale_const
            mulps       xmm0,xmm2
            mulps       xmm1,xmm2
            movaps      xmmword ptr [tws + i * 20h],xmm0
            movaps      xmmword ptr [tws + i * 20h + 10h],xmm1
            endm
cvt_store   macro       i, r, offs
            ;;; OUT [eax . . .] = coeff. row
            cvtps2dq    r,r
            packssdw    r,r
if offs EQ 0                                                ;;; low
            movlps      xmmword ptr [eax + i * 10h],r
else
            movhps      xmmword ptr [eax + i * 10h + 08h],r
endif
            endm
```

APPENDIX A-continued

```
idct_column           macro   offs
        ;;; IN        tws -> float 8×8 block (esp + 4)
        ;;; IN        eax -> dst (short 8×8 block)
        ;;; OUT       [eax . . .] = short 8×8 block
        movaps       xmm5,xmmword ptr [tws + 30h * 2 + offs]
        movaps       xmm6,xmmword ptr [tws + 50h * 2 + offs]
        movaps       xmm7,xmm6
        addps        xmm6,xmm5
        subps        xmm7,xmm5
        movaps       xmm4,xmmword ptr [tws + 10h * 2 + offs]
        movaps       xmm3,xmmword ptr [tws + 70h * 2 + offs]
        movaps       xmm5,xmm4
        addps        xmm4,xmm3
        subps        xmm5,xmm3
        movaps       xmm3,xmm4
        addps        xmm4,xmm6
        subps        xmm3,xmm6
        mulps        xmm3,xmmword ptr Cp1_414f
        movaps       xmm6,xmm7
        addps        xmm6,xmm5
        mulps        xmm6,xmmword ptr Cp1_847f
        mulps        xmm7,xmmword ptr Cm2_613f              ;;; ;;; ;;;
        addps        xmm7,xmm6
        mulps        xmm5,xmmword ptr Cp1_082f
        subps        xmm5,xmm6
        subps        xmm7,xmm4
        subps        xmm3,xmm7
        addps        xmm5,xmm3
        movaps       xmmword ptr ssetmp_store,xmm4
        movaps       xmm0,xmmword ptr [tws + 00h * 2 + offs]
        movaps       xmm2,xmmword ptr [tws + 40h * 2 + offs]
        movaps       xmm6,xmm0
        addps        xmm0,xmm2
        subps        xmm6,xmm2
        movaps       xmm1,xmmword ptr [tws + 20h * 2 + offs]
        movaps       xmm2,xmmword ptr [tws + 60h * 2 + offs]
        movaps       xmm4,xmm1
        addps        xmm1,xmm2
        subps        xmm4,xmm2
        mulps        xmm4,xmmword ptr Cp1_414f
        subps        xmm4,xmm1
        movaps       xmm2,xmm0
        addps        xmm0,xmm1
        subps        xmm2,xmm1
        movaps       xmm1,xmm0
        addps        xmm0,xmmword ptr ssetmp_store
        subps        xmm1,xmmword ptr ssetmp_store
        cvt_store            0, xmm0, offs
        cvt_store            7, xmm1, offs
        movaps       xmm1,xmm2
        addps        xmm2,xmm5
        subps        xmm1,xmm5
        cvt_store            4, xmm2, offs
        cvt_store            3, xmm1, offs
        movaps       xmm5,xmm6
        addps        xmm6,xmm4
        subps        xmm5,xmm4
        movaps       xmm4,xmm6
        addps        xmm6,xmm7
        subps        xmm4,xmm7
        cvt_store            1, xmm6, offs
        cvt_store            6, xmm4, offs
        movaps       xmm7,xmm5
        addps        xmm5,xmm3
        subps        xmm7,xmm3
        cvt_store            2, xmm5, offs
        cvt_store            5, xmm7, offs
        endm
;;; 8×8 iDCT; integer row stage; AAN float column stage
_idct8x8ssfs    proc    near
        ;;; IN/OUT [esp + 4] -> short 8×8 block
        mov          eax,esp
        sub          esp,0110h                ;;; space for float 8×8 block
        and          esp, 0fffffff0h
        push         eax
        mov          eax, [eax + 4]
```

APPENDIX A-continued

```
        ;;; eax -> short IN/OUT 8x8 block
        ;;; esp + 4 -> float intermediate 8x8 block
        idct_row2           0, wcorr0w
        idct_row2           2, wcorr2w
        idct_row2           4, wcorr4w
        idct_row2           6, wcorr6w
if 0
        idct_row            0, wcorr0w
        idct_row            1, wcorr1w
        idct_row            2, wcorr2w
        idct_row            3, wcorr3w
        idct_row            4, wcorr4w
        idct_row            5, wcorr5w
        idct_row            6, wcorr6w
        idct_row            7, wcorr7w
endif
        idct_column         00h
        idct_column         10h
exit:
        mov                 esp, [esp]
        ret
_idct8x8ssfs                endp
_TEXT       ends
_DATA       segment
Cp1_082f            dd      1.082392200,    1.082392200,    1.082392200,
1.082392200
Cp1_414f            dd      1.414213562,    1.414213562,    1.414213562,
1.414213562
Cp1_847f            dd      1.847759065,    1.847759065,    1.847759065,
1.847759065
Cm2_613f            dd      -2.613125930,   -2.613125930,   -2.613125930,
-2.613125930
;;; ;;; short-float data
        align               10h
;;; even 01           even 23
;;; even tail 01      even tail 23
;;; odd 01            odd 23
;;; odd tail 01       odd tail 23
;;; 2^17
wcorr0w     dw      4000h,   539Fh,   4000h,   22A3h,   4000h,   0DD5Eh,  4000h,   0AC62h
            dw      4000h,   22A3h,   0C001h,  0AC62h,  0C001h,  539Fh,   4000h,   0DD5Eh
            dw      58C5h,   4B42h,   4B42h,   0EE59h,  3249h,   0A73Ch,  11A8h,   0CDB8h
            dw      3249h,   11A8h,   0A73Ch,  0CDB8h,  11A8h,   4B42h,   4B42h,   0A73Ch
wcorr1w     dw      58C5h,   73FCh,   58C5h,   300Bh,   58C5h,   0CFF6h,  58C5h,   08C05h
            dw      58C5h,   300Bh,   0A73Ch,  08C05h,  0A73Ch,  73FCh,   58C5h,   0CFF6h
            dw      7B21h,   6862h,   6862h,   0E783h,  45BFh,   084E0h,  187Eh,   0BA42h
            dw      45BFh,   187Eh,   084E0h,  0BA42h,  187Eh,   6862h,   6862h,   084E0h
wcorr2w     dw      539Fh,   6D41h,   539Fh,   2D41h,   539Fh,   0D2C0h,  539Fh,   092C0h
            dw      539Fh,   2D41h,   0AC62h,  092C0h,  0AC62h,  6D41h,   539Fh,   0D2C0h
            dw      73FCh,   6254h,   6254h,   0E8EFh,  41B3h,   08C05h,  1712h,   0BE4Eh
            dw      41B3h,   1712h,   08C05h,  0BE4Eh,  1712h,   6254h,   6254h,   08C05h
wcorr3w     dw      4B42h,   6254h,   4B42h,   28BAh,   4B42h,   0D747h,  4B42h,   09DADh
            dw      4B42h,   28BAh,   0B4BFh,  09DADh,  0B4BFh,  6254h,   4B42h,   0D747h
            dw      6862h,   587Eh,   587Eh,   0EB3Eh,  3B21h,   0979Fh,  14C3h,   0C4E0h
            dw      3B21h,   14C3h,   0979Fh,  0C4E0h,  14C3h,   587Eh,   587Eh,   0979Fh
wcorr4w     dw      4000h,   539Fh,   4000h,   22A3h,   4000h,   0DD5Eh,  4000h,   0AC62h
            dw      4000h,   22A3h,   0C001h,  0AC62h,  0C001h,  539Fh,   4000h,   0DD5Eh
            dw      58C5h,   4B42h,   4B42h,   0EE59h,  3249h,   0A73Ch,  11A8h,   0CDB8h
            dw      3249h,   11A8h,   0A73Ch,  0CDB8h,  11A8h,   4B42h,   4B42h,   0A73Ch
wcorr5w     dw      3249h,   41B3h,   3249h,   1B37h,   3249h,   0E4CAh,  3249h,   0BE4Eh
            dw      3249h,   1B37h,   0CDB8h,  0BE4Eh,  0CDB8h,  41B3h,   3249h,   0E4CAh
            dw      45BFh,   3B21h,   3B21h,   0F221h,  2782h,   0BA42h,  0DE0h,   0D87Fh
            dw      2782h,   0DE0h,   0BA42h,  0D87Fh,  0DE0h,   3B21h,   3B21h,   0BA42h
wcorr6w     dw      22A3h,   2D41h,   22A3h,   12BFh,   22A3h,   0ED42h,  22A3h,   0D2C0h
            dw      22A3h,   12BFh,   0DD5Eh,  0D2C0h,  0DD5Eh,  2D41h,   22A3h,   0ED42h
            dw      300Bh,   28BAh,   28BAh,   0F673h,  1B37h,   0CFF6h,  098Eh,   0E4CAh
            dw      1B37h,   098Eh,   0CFF6h,  0E4CAh,  098Eh,   28BAh,   28BAh,   0CFF6h
wcorr7w     dw      11A8h,   1712h,   11A8h,   098Eh,   11A8h,   0F673h,  11A8h,   0E8EFh
            dw      11A8h,   098Eh,   0EE59h,  0E8EFh,  0EE59h,  1712h,   11A8h,   0F673h
            dw      187Eh,   14C3h,   14C3h,   0FB22h,  0DE0h,   0E783h,  04DFh,   0F221h
            dw      0DE0h,   04DFh,   0E783h,  0F221h,  04DFh,   14C3h,   14C3h,   0E783h
            ;;; 1 / 2^17
scale_const         dd      37000000h, 37000000h, 37000000h, 37000000h
_DATA       ends
            end
```

APPENDIX B

Below are the results of an inverse DCT IEEE 1180–1990 compliance test. The test was performed for 10,000 iterations.
Each element of the tables in this section corresponds to one output DCT coefficient of an 8×8 coefficient block.

1. Single-precision floating-point 8×8 inverse DCT (a) The input values are in the range of [−255; 255]
Peak absolute values of errors:

| | | | | | | | |
|---|---|---|---|---|---|---|---|
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 1 | 0 | 0 | 0 | 0 | 1 | 0 | 0 |
| 0 | 0 | 0 | 0 | 0 | 0 | 1 | 0 |
| 0 | 0 | 0 | 1 | 0 | 0 | 0 | 0 |
| 0 | 0 | 0 | 0 | 0 | 0 | 0 | 0 |

Worst peak error = 1 (meets spec limit 1)
Mean square errors:

| | | | | | | | |
|---|---|---|---|---|---|---|---|
| 0.0000 | 0.0002 | 0.0000 | 0.0000 | 0.0000 | 0.0000 | 0.0000 | 0.0000 |
| 0.0000 | 0.0001 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0001 | 0.0000 | 0.0000 | 0.0000 |
| 0.0001 | 0.0000 | 0.0000 | 0.0000 | 0.0000 | 0.0001 | 0.0000 | 0.0000 |
| 0.0000 | 0.0000 | 0.0000 | 0.0000 | 0.0000 | 0.0000 | 0.0001 | 0.0000 |
| 0.0000 | 0.0000 | 0.0000 | 0.0001 | 0.0000 | 0.0000 | 0.0000 | 0.0000 |
| 0.0000 | 0.0000 | 0.0000 | 0.0000 | 0.0000 | 0.0000 | 0.0000 | 0.0000 |

Worst pmse = 0.000200 (meets spec limit 0.06)
Overall mse = 0.000013 (meets spec limit 0.02)
(b) The input values are in the range of [−5; 5]
Peak absolute values of errors:

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Worst peak error = 0 (meets spec limit 1)
Mean square errors:

| | | | | | | | |
|---|---|---|---|---|---|---|---|
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 |
| 0.0000 | 0.0000 | 0.0000 | 0.0001 | 0.0000 | 0.0000 | 0.0000 | 0.0000 |
| 0.0000 | 0.0000 | 0.0000 | 0.0000 | 0.0000 | 0.0000 | 0.0000 | 0.0000 |

Worst pmse = 0.000000 (meets spec limit 0.06)
Overall mse = 0.000000 (meets spec limit 0.02)

2. Mixed integer/single-precision floating-point 8×8 inverse DCT (a) The input values are in the range of [−255; 255]
Peak absolute values of errors:

| | | | | | | | |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Worst peak error = 1 (meets spec limit 1)
Mean square errors:

| | | | | | | | |
|---|---|---|---|---|---|---|---|
| 0.0006 | 0.0039 | 0.0018 | 0.0030 | 0.0027 | 0.0027 | 0.0039 | 0.0013 |
| 0.0016 | 0.0071 | 0.0038 | 0.0035 | 0.0047 | 0.0061 | 0.0068 | 0.0025 |
| 0.0027 | 0.0073 | 0.0060 | 0.0050 | 0.0057 | 0.0069 | 0.0080 | 0.0019 |
| 0.0022 | 0.0069 | 0.0077 | 0.0062 | 0.0074 | 0.0069 | 0.0071 | 0.0031 |
| 0.0023 | 0.0086 | 0.0071 | 0.0072 | 0.0067 | 0.0071 | 0.0082 | 0.0028 |
| 0.0023 | 0.0080 | 0.0062 | 0.0071 | 0.0058 | 0.0058 | 0.0087 | 0.0032 |
| 0.0026 | 0.0060 | 0.0058 | 0.0044 | 0.0064 | 0.0043 | 0.0057 | 0.0025 |
| 0.0013 | 0.0030 | 0.0030 | 0.0041 | 0.0031 | 0.0020 | 0.0029 | 0.0010 |

Worst pmse = 0.008700 (meets spec limit 0.06)
Overall mse = 0.004722 (meets spec limit 0.02)
(b) The input values are in the range of [−5; 5]
Peak absolute values of errors:

| | | | | | | | |
|---|---|---|---|---|---|---|---|
| 1 | 1 | 1 | 1 | 1 | 0 | 0 | 0 |
| 0 | 0 | 1 | 0 | 0 | 1 | 1 | 0 |
| 0 | 0 | 1 | 1 | 1 | 1 | 1 | 1 |
| 1 | 1 | 1 | 0 | 1 | 1 | 1 | 0 |
| 1 | 1 | 1 | 1 | 1 | 1 | 1 | 1 |
| 0 | 1 | 1 | 0 | 1 | 1 | 1 | 1 |
| 1 | 1 | 1 | 0 | 1 | 1 | 1 | 1 |
| 0 | 0 | 1 | 0 | 0 | 1 | 0 | 1 |

Worst peak error = 1 (meets spec limit 1)
Mean square errors:

| | | | | | | | |
|---|---|---|---|---|---|---|---|
| 0.0001 | 0.0001 | 0.0001 | 0.0001 | 0.0002 | 0.0000 | 0.0000 | 0.0000 |
| 0.0000 | 0.0000 | 0.0001 | 0.0000 | 0.0000 | 0.0002 | 0.0001 | 0.0000 |
| 0.0000 | 0.0000 | 0.0002 | 0.0002 | 0.0003 | 0.0002 | 0.0004 | 0.0001 |
| 0.0001 | 0.0002 | 0.0001 | 0.0000 | 0.0001 | 0.0001 | 0.0002 | 0.0000 |
| 0.0001 | 0.0003 | 0.0002 | 0.0001 | 0.0001 | 0.0002 | 0.0001 | 0.0001 |
| 0.0000 | 0.0001 | 0.0003 | 0.0000 | 0.0002 | 0.0001 | 0.0002 | 0.0002 |
| 0.0002 | 0.0001 | 0.0001 | 0.0000 | 0.0001 | 0.0003 | 0.0001 | 0.0001 |
| 0.0000 | 0.0000 | 0.0002 | 0.0000 | 0.0000 | 0.0002 | 0.0000 | 0.0001 |

Worst pmse = 0.000400 (meets spec limit 0.06)
Overall mse = 0.000109 (meets spec limit 0.02)

3. Integer 8×8 inverse DCT (a) The input values are in the range of [−255; 255]
Peak absolute values of errors:

| | | | | | | | |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

Worst peak error = 1 (meets spec limit 1)
Mean square errors:

| | | | | | | | |
|---|---|---|---|---|---|---|---|
| 0.0126 | 0.0118 | 0.0130 | 0.0126 | 0.0110 | 0.0125 | 0.0127 | 0.0119 |
| 0.0154 | 0.0161 | 0.0156 | 0.0159 | 0.0153 | 0.0167 | 0.0168 | 0.0173 |
| 0.0172 | 0.0151 | 0.0160 | 0.0134 | 0.0154 | 0.0167 | 0.0187 | 0.0137 |
| 0.0135 | 0.0126 | 0.0125 | 0.0145 | 0.0132 | 0.0136 | 0.0120 | 0.0116 |
| 0.0127 | 0.0133 | 0.0140 | 0.0119 | 0.0120 | 0.0119 | 0.0118 | 0.0139 |
| 0.0157 | 0.0159 | 0.0154 | 0.0157 | 0.0163 | 0.0143 | 0.0175 | 0.0160 |
| 0.0158 | 0.0147 | 0.0183 | 0.0172 | 0.0152 | 0.0152 | 0.0146 | 0.0150 |
| 0.0133 | 0.0133 | 0.0119 | 0.0128 | 0.0134 | 0.0146 | 0.0132 | 0.0129 |

Worst pmse = 0.018700 (meets spec limit 0.06)
Overall mse = 0.014322 (meets spec limit 0.02)
(b) The input values are in the range of [−5; 5]
Peak absolute values of errors:

| | | | | | | | |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

APPENDIX B-continued

Below are the results of an inverse DCT IEEE 1180–1990 compliance test.
The test was performed for 10,000 iterations.
Each element of the tables in this section corresponds to one output DCT
coefficient of an 8×8 coefficient block.

| 1 | 1 | 1 | 1 | 1 | 1 | 1 | 1 |
| 1 | 1 | 1 | 1 | 1 | 1 | 1 | 1 |

Worst peak error = 1 (meets spec limit 1)
Mean square errors:

| 0.0132 | 0.0147 | 0.0132 | 0.0125 | 0.0121 | 0.0109 | 0.0121 | 0.0116 |
| 0.0145 | 0.0176 | 0.0166 | 0.0177 | 0.0159 | 0.0147 | 0.0157 | 0.0161 |
| 0.0160 | 0.0181 | 0.0185 | 0.0144 | 0.0159 | 0.0158 | 0.0170 | 0.0145 |
| 0.0128 | 0.0110 | 0.0136 | 0.0140 | 0.0128 | 0.0127 | 0.0119 | 0.0136 |
| 0.0122 | 0.0122 | 0.0134 | 0.0126 | 0.0113 | 0.0136 | 0.0120 | 0.0115 |
| 0.0175 | 0.0156 | 0.0157 | 0.0142 | 0.0160 | 0.0156 | 0.0153 | 0.0148 |
| 0.0174 | 0.0138 | 0.0173 | 0.0159 | 0.0139 | 0.0160 | 0.0147 | 0.0163 |
| 0.0107 | 0.0125 | 0.0132 | 0.0136 | 0.0128 | 0.0137 | 0.0118 | 0.0141 |

Worst pmse = 0.018500 (meets spec limit 0.06)
Overall mse = 0.014264 (meets spec limit 0.02)

APPENDIX C

| DCT functions, optimized for Pentium ®4 processor | clocks |
|---|---|
| Inverse | |
| Single-precision floating-point inverse DCT | 560 |
| Mixed integer/floating-point inverse DCT | 416 |
| Integer inverse DCT | 306 |
| Forward | |
| Single-precision floating-point forward DCT | 540 |
| Mixed integer/floating-point forward DCT | 412 |
| Integer forward DCT | 272 |

What is claimed is:

1. A computer-implemented method of performing two-dimensional (2) inverse or forward Discrete Cosine Transform (DCT) on an N×M coefficient block, where N and M are natural numbers, comprising:
applying, by executing at least one instruction in a computer system supporting Single Instruction Multiple Data (SIMD) operations, one-dimensional (1D) integer DCT to rows of the coefficient block;
converting, by executing at least one instruction in the computer system supporting SIMD operations, result data from the 1D integer DCT into single precision floating point values; and
applying, by executing at least one instruction in the computer system supporting SIMD operations, 1D single precision floating point DCT to columns of an N×M coefficient block resulting from converting the result data.

2. The method of claim 1, wherein the 1D integer DCT applied to rows further comprises a N-point DCT operation implemented using fixed point integer computations.

3. The method of claim 2, wherein a number of bits used to represent intermediate values of the fixed point integer computations and output values of the N-point DCT operation is at least twice as large as the number of bits representing input values of the N-point DCT.

4. The method of claim 2, wherein the N-point DCT is implemented using SIMD instructions that support inter-operand dependencies.

5. The method of claim 2, wherein converting result data further comprises applying a conversion operation to the output values of the N-point DCT to produce N single precision floating point coefficients.

6. The method of claim 5, wherein the conversion operation is implemented using SIMD instructions and applied to several elements of the coefficient block simultaneously.

7. The method of claim 1, wherein 1D single precision floating point DCT applied to columns further comprises a M-point DCT implemented using single precision floating point computations.

8. The method of claim 7, wherein the single precision floating point DCT is implemented using SIMD instructions to apply the DCT operation to several columns simultaneously.

9. An article comprising: a machine accessible medium having instructions, which, when executed in a processing system that supports Single Instruction Multiple Data (SIMD) operations, cause the processing system to perform a method of applying two-dimensional (2D) inverse or forward Discrete Cosine Transform (DCT) to an N×M coefficient block, where N and M are natural numbers, by
applying one-dimensional (1D) integer DCT to rows of the coefficient block;
converting result data from the 1D integer DCT into single precision floating point values; and
applying 1D single precision floating point DCT to columns of an N×M coefficient block resulting from converting the result data.

10. The article of claim 9, wherein instructions for the 1D integer DCT applied to rows further comprise instructions for a N-point DCT operation implemented using fixed point integer computations.

11. The article of claim 10, wherein a number of bits used to represent intermediate values of the fixed point integer computations and output values of the N-point DCT operation is at least twice as large as the number of bits representing input values of the N-point DCT.

12. The article of claim 10, wherein the N-point DCT is implemented using instructions for SIMD operations that support inter-operand dependencies.

13. The article of claim 10, wherein instructions for converting result data further comprise instructions for applying a conversion operation to the output values of the N-point DCT to produce N single precision floating point coefficients.

14. The article of claim 13, wherein the conversion operation is implemented using SIMD instructions and applied to several elements of the coefficient block simultaneously.

15. The article of claim 9, wherein instructions for applying the 1D single precision floating point DCT to columns further comprise instructions for a M-point DCT implemented using single precision floating point computations.

16. The article of claim 15, wherein the single precision floating point DCT is implemented using SIMD instructions to apply the DCT operation to several columns simultaneously.

* * * * *

UNITED STATES PATENT AND TRADEMARK OFFICE
CERTIFICATE OF CORRECTION

PATENT NO. : 7,007,055 B2 Page 1 of 1
APPLICATION NO. : 10/096987
DATED : February 28, 2006
INVENTOR(S) : Zheltov et al.

It is certified that error appears in the above-identified patent and that said Letters Patent is hereby corrected as shown below:

In column 25, at line 40, delete "(2)" and insert --(2D)--.

Signed and Sealed this

Sixth Day of November, 2007

JON W. DUDAS
*Director of the United States Patent and Trademark Office*